March 7, 1933.  R. HAASE  1,900,808
CARRYING MECHANISM FOR CALCULATING MACHINES AND THE LIKE
Filed Nov. 9, 1931
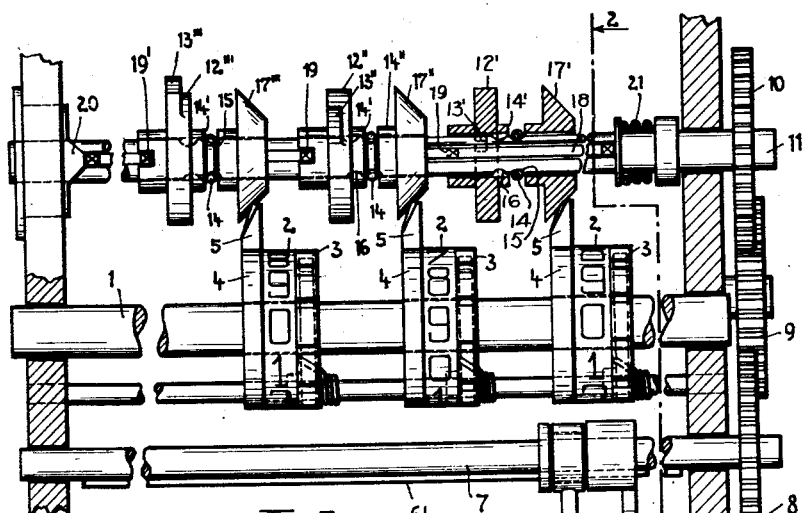
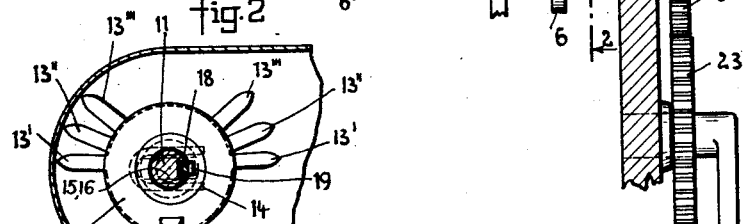
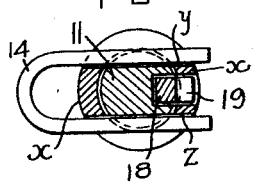
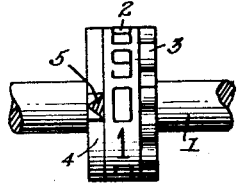
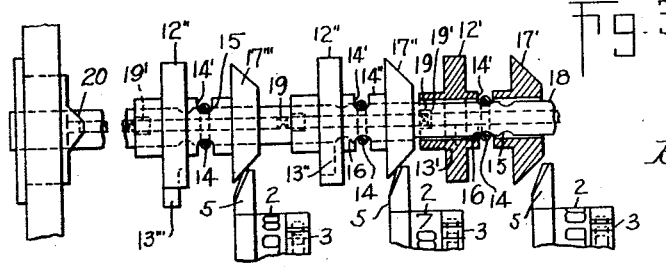
Inventor,
Richard Haase,
Attorney.

Patented Mar. 7, 1933

1,900,808

UNITED STATES PATENT OFFICE

RICHARD HAASE, OF BRUNSWICK, GERMANY, ASSIGNOR TO BRUNSVIGA-MASCHINEN-WERKE GRIMME, NATALIS & CO., AKTIENGESELLSCHAFT, OF BRUNSWICK, GERMANY

CARRYING MECHANISM FOR CALCULATING MACHINES AND THE LIKE

Application filed November 9, 1931, Serial No. 573,995, and in Germany October 1, 1930.

My invention relates to improvements in carrying mechanisms for calculating machines and the like, and more particularly in carrying mechanisms, comprising carrying disks equipped with one or two teeth and adapted to be axially shifted on a shaft by means of teeth or cams carried by the numeral wheels or intermediate wheels cooperating therewith. The object of the improvements is to provide carrying mechanism of this type in which the carrying disks are directly shifted by means of a rod carrying lugs or teeth one for each of said disks, the said rod being axially shiftable on the shaft on which the carrying disks are mounted. Another object of the improvements is to provide simple means for locking the carrying disks in operative and inoperative position, and with this object in view my invention consists in providing the shaft carrying the carrying disks with annular grooves two for each carrying disk, the said grooves being adapted for engagement by springs connected with the carrying disks.

For the purpose of explaining the invention an example embodying the same has been shown in the accompanying drawing in which the same reference characters have been used in all the views to indicate corresponding parts. In said drawing, Fig. 1 is a sectional elevation showing a part of the revolutions counting mechanism and the carrying mechanism thereof, Fig. 2 is a sectional elevation taken on the line 2—2 of Fig. 1.

Fig. 3, a view similar to Fig. 1, but showing certain parts in another position.

Fig. 4, a cross-section of a shaft shown in Fig. 1, and

Fig. 5, an elevation of a numeral wheel, viewed radially of a carrying tooth thereon.

In the drawing a revolutions counting mechanism has been illustrated, which is equipped with my improved carrying mechanism. But I wish it to be understood that my invention is not limited to the use of the carrying mechanism in revolutions counting mechanisms or in calculating machines.

On a shaft 1 numeral wheels 2 are rotatably mounted, the numeral disks of which are connected at one side with gear-wheels 3 and at the opposite side with disks 4 each having a carrying tooth 5. Suitable means are provided for preventing axial displacement of the numeral wheels on the shaft 1. On a shaft 7 a single tooth 6 is axially shiftable, rotary movement of the said tooth being prevented by suitable means such as a feather 6'. The said single tooth is adapted to be shifted in axial direction from the slide carrying the registering mechanism as is known in the art. The mechanism for shifting the tooth 6 does not form a part of my invention, and therefore I deem it not necessary to describe the same in detail. It has been described for example in U. S. Patent Nos. 935,565 and 975,180. Rotary movement is imparted to the shaft 7 by means of the machine crank 22 through the intermediary of gear-wheels 23 and 8. The gear-wheel 8 is connected through an intermediate gear-wheel 9 with a gear-wheel 10 secured to a carrying shaft 11 forming a part of the carrying mechanism. On the said shaft carrying wheels 12', 12'', 12''' etc. are mounted, each of which carries a tooth 13', 13'', 13''' etc. The teeth 13', 13'', 13''' etc. of the successive orders are displaced with relation to one another in circumferential direction, as is shown in Fig. 2, and the teeth are disposed on a helical line. As appears from Fig. 2, two sets of teeth 13', 13'', 13''' etc. are provided, one set for each direction of rotation. The carrying wheels 12', 12'', 12''' etc. are axially shiftable on the shaft 11, and means are provided for arresting the same in either position. The said arresting mechanism comprises a U-shaped spring 14 for each combined carrying disk and wheel, and a pair of notches 15—16 for each spring. As shown, the hub 14'' of each carrying disk is provided with a slot 14' providing a seat for a U-shaped spring 14 adapted for engagement with the said notches for positioning the wheels 12', 12'', 12''' etc. in either position axially of the shaft 11. The carrying wheels 12', 12'', 12'' etc. are connected with conical disks 17', 17'', 17''' etc. which are in position to be engaged by the teeth 5 whenever a numeral wheel 2 passes from 9 to 0 or from 0 to 9. By the pressure exerted by the teeth 5 on the conical disks 17', 17'' or 17''' etc. the corresponding carrying disk is shifted to the left and into operative position, and the legs of spring 14 ride out of the notch 15 and engage the notch 16. In the position of the parts shown in Fig. 3 the carrying wheel 12' has thus been shifted into operative position. Now one of the teeth 13' of the carrying wheel engages the numeral wheel 2 of the next higher order and advances the same a distance corresponding to two consecutive teeth. The carrying wheel is automatically returned into initial position by means of a slidable key 18 formed with lugs 19 one for each of the carrying wheels, the said rod being shiftable in a longitudinal groove of the shaft 11. The lugs 19 engage in slots 19' of the hubs 14'' of the carrying wheels, so that they transmit rotary movement of the shaft 11 to the carrying wheels 12', 12'', 12''' etc. The rod 18 and its lugs 19 are in a form resembling a comb. The rod is controlled by a cam face 20 secured to the machine frame and adapted to shift the rod, at the end of the rotary movement of the shaft 11, to the right in opposition to the action of a spring 21. Thereby the carrying wheels are returned into inoperative positions, and the rod 18 is held in the said position by the cam 20, while the crank 22 is at rest. Whenever the crank 22 is rotated the rod 18 passes out of engagement with the cam 20, and the spring 21 shifts the same to the left. Thereby the lugs 19 are moved out of the slots 19' of the hubs 14'', so that carrying wheels are out of engagement with the lugs 19 of the rod 18, and they are adapted to be shifted to the left and into operative position while the shaft 11 is being rotated, whenever a carrying operation is to be performed.

The operation of the apparatus is as follows: When the machine crank 22 is operated the rotary movement is transmitted to the shafts 7 and 11, and the single tooth 6 advances one of the numeral wheels 2 one step according to the position of the slide controlling the position thereof. If one of the numeral wheels passes from 9 to 0 or vice versa, the carrying tooth 5 of the said numeral wheel engages the beveled face of the disk 17', 17'' etc., and it shifts the carrying wheel 12', 12'' etc. to the left and into operative position, the said carrying wheel being arrested in the said position by the spring 14 engaging in the notch 16. Upon further movement of the shaft 11 the tooth 13', 13'' or 13''' which has been shifted into operative position turns the gearwheel 3 of the numeral wheel of the next higher order one step. At the end of the rotary movement of the crank the cam 20 shifts the rod 18 to the right, so that all the carrying wheels 12', 12'' etc. are returned, by the lugs 19, into initial position in which they are arrested by the springs 14.

While in describing the invention reference has been made to a particular example embodying the same I wish it to be understood that my invention is not limited to the construction shown in the accompanying drawing and that various changes may be made in the general arrangement of the apparatus and the construction of its parts without departing from the invention.

I claim:

1. In a carrying mechanism for calculating machines and the like, the combination of numeral wheels provided with carrying teeth, carrying wheels for the respective numeral wheels mounted on a shaft parallel to the axis of said numeral wheels and adapted to be engaged by said teeth for shifting the carrying wheels into carrying position, a rod mounted on said shaft and axially shiftable thereon and adapted when shifted to move said carrying wheels out of operative position, and means for moving said rod.

2. In a carrying mechanism for calculating machines and the like, the combination of numeral wheels provided with carrying teeth, carrying wheels for the respective numeral wheels mounted on a shaft parallel to the axis of said numeral wheels and adapted to be shifted by said teeth into carrying position, a rod mounted on said shaft and axially shiftable thereon and adapted when shifted to move said carrying wheels out of operative position, and a cam and spring controlling the movement of said rod in opposite directions.

3. In a carrying mechanism for calculating machines and the like, the combination of numeral wheels provided with carrying teeth, carrying wheels for the respective numeral wheels mounted on a shaft parallel to the axis of said numeral wheels and adapted to be shifted by said teeth into carrying position, means for returning said carrying wheels into inoperative position, said shaft being formed with a pair of notches for each carrying wheel, and springs associated with said carrying wheels and adapted for engagement with either of said notches.

4. In a carrying mechanism for calculating machines and the like, the combination of numeral wheels provided with carrying teeth, carrying wheels for the respective numeral wheels mounted on a shaft parallel to the axis of said numeral wheels and adapted to be shifted by said teeth into carrying position, said disks being formed with axial slots, a rod mounted on said shaft and axially shiftable thereon and adapted when shifted to move said carrying wheels out of operative position, said rod being formed with lugs adapted to engage said slots for imparting rotary movement to said carrying wheels, and means for moving said rod.

5. In a carrying mechanism for calculating machines and the like, a series of numeral wheels having a common axis, a series of carrying wheels having an axis parallel to that of the numeral wheels, fixed teeth projecting from the numeral wheels into position to engage faces on the carrying wheels for moving said wheels axially into operative position, and means for returning the carrying wheels to idle position.

6. In a carrying mechanism for calculating machines and the like, the combination of numeral wheels provided with carrying teeth, carrying wheels for the respective numeral wheels, a shaft on which the carrying wheels are mounted said shaft having a longitudinal slot, means for shifting the carrying wheels individually axially into operative position, a rod slidably mounted in the slot in the carrying wheel shaft, lugs on the rod engageable with the individual carrying wheels, and means for positively moving the rod at a point in the rotation of the carrying wheel shaft for returning any operatively-located carrying wheel to idle position.

In testimony whereof I affix my signature.

RICHARD HAASE.